(12) United States Patent
McAllister

(10) Patent No.: US 12,526,359 B2
(45) Date of Patent: Jan. 13, 2026

(54) HANDS-FREE SMARTPHONE HOLDER WITH MOUTHPIECE

(71) Applicant: Cooper McAllister, Woodbury, CT (US)

(72) Inventor: Cooper McAllister, Woodbury, CT (US)

( * ) Notice: Subject to any disclaimer, the term of this patent is extended or adjusted under 35 U.S.C. 154(b) by 325 days.

(21) Appl. No.: 18/316,312

(22) Filed: May 12, 2023

(65) Prior Publication Data

US 2024/0380833 A1    Nov. 14, 2024

(51) Int. Cl.
*H04M 1/05*    (2006.01)

(52) U.S. Cl.
CPC ..................... *H04M 1/05* (2013.01)

(58) Field of Classification Search
CPC ........ H04M 1/04; H04M 1/6041; H04M 1/05; H04M 2201/08; H04M 1/0279; H04M 1/724095
See application file for complete search history.

(56) References Cited

U.S. PATENT DOCUMENTS

| | | | | |
|---|---|---|---|---|
| 9,983,463 | B1* | 5/2018 | Rohrer | G03B 17/561 |
| 2015/0316205 | A1* | 11/2015 | Bennett | G03B 17/563 |
| | | | | 224/181 |
| 2018/0198968 | A1* | 7/2018 | Heine | H04M 1/05 |
| 2019/0099241 | A1* | 4/2019 | Way | A61C 7/008 |
| 2020/0146426 | A1* | 5/2020 | Kuroglu Tan | A45F 5/00 |
| 2024/0122689 | A1* | 4/2024 | Pellissard | H04B 1/3877 |
| 2024/0164629 | A1* | 5/2024 | Pellissard | A61B 1/0014 |
| 2024/0225795 | A1* | 7/2024 | Pai | A46B 11/0065 |
| 2024/0298892 | A1* | 9/2024 | Pellissard | A61B 1/00059 |
| 2024/0359635 | A1* | 10/2024 | McIntosh | B60R 11/0241 |

* cited by examiner

*Primary Examiner* — Alison Slater
(74) *Attorney, Agent, or Firm* — Lipsitz & McAllister, LLC

(57) ABSTRACT

A hands-free smartphone holder is provided. The hands-free smartphone holder may comprise a gripping element adapted to be removably secured to a smartphone and a mouthpiece connected to the gripping element. The mouthpiece is adapted to be held by a mouth of a user such that a camera of the smartphone shows a point of view of the user. The mouthpiece may be formed in one piece with the gripping element. Alternatively, the mouthpiece may be removably connected to the gripping element. The gripping element may comprise a flexible band with opposing ends which are bendable into hooks for gripping opposing sides of the smartphone. Alternatively, the gripping element may comprise a suction device or flat surface with an adhesive coating. A removable cover may be provided for covering the mouthpiece. An exterior of the removable cover may comprise a stand for the smartphone.

11 Claims, 5 Drawing Sheets

HANDS-FREE SMARTPHONE HOLDER WITH MOUTHPIECE

BACKGROUND OF THE INVENTION

The present invention relates to the field of holders for electronic devices such as smart phones. In particular, the present invention is directed to a smartphone holder that is gripped by the mouth of a user to enable hands free videos and photos.

There are many prior art smartphone holders on the market. However, the existing smartphone holders either provide a way for a user to take a selfie (such as a selfie stick), provide a way to mount the smartphone to a vertical surface, or provide a way to prop a cell phone up at an angle on a horizontal surface. The existing smartphone holders that are held by a user are directed at taking videos or pictures of the user (selfies).

In certain circumstances, it would be desirable to take videos or pictures from the user's point of view (POV) using a hands-free holder. Such a holder would enable the user to use their hands for an activity while taking POV videos or pictures, for example taking videos or pictures in a mirror during a user's activity, such as weightlifting, or taking POV videos or pictures of other physical activity.

The apparatus and methods of the present invention provide the foregoing and other advantages.

SUMMARY OF THE INVENTION

The present invention relates to a smartphone holder that is gripped by the mouth of a user to enable hands free videos and photos.

In one example embodiment of the present invention, a hands-free smartphone holder is provided. The hands-free smartphone holder may comprise a gripping element adapted to be removably secured to a smartphone and a mouthpiece connected to the gripping element. The mouthpiece is adapted to be held by a mouth of a user such that a camera of the smartphone shows a point of view of the user.

The mouthpiece may be formed in one piece with the gripping element. Alternatively, the mouthpiece may be removably connected to the gripping element.

In one example embodiment, the gripping element may comprise a removable adhesive mount or a suction mount. The mouthpiece may be connected to the mount by a connector.

In a further example embodiment, the gripping element may comprise a flexible band with opposing ends which are bendable into hooks for gripping opposing sides of the smartphone. The flexible band may be adapted to grip the opposing sides of the smartphone in a vertical or horizontal orientation.

When the gripping element is secured to the smartphone, the flexible band may be positioned across an area of a screen of the smartphone with the opposing ends wrapping around to a back of the smartphone such that a camera of the smartphone is facing away from the user when in use.

In a further example embodiment, when the gripping element is secured to the smartphone, the flexible band is positioned across an area of a back of the smartphone with the opposing ends wrapping around to an area of a screen of the smartphone. In such an embodiment, the mouthpiece is connected to the smartphone via an elongated flexible connector that loops around from the back of the smartphone to a front of the smartphone such that a camera of the smartphone is facing away from the user when in use.

A removable cover may be provided for covering the mouthpiece. An exterior of the removable cover may comprise a stand for the smartphone.

The hands-free smartphone holder may also comprise a connector connecting the mouthpiece to the gripping element. The mouthpiece, gripping element, and connector may be formed in one piece.

The mouthpiece may comprise one of a curved plate adapted to be held between upper and lower teeth of a user, a boil and bite moldable mouthpiece, a preformed mouthpiece, or the like.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 1:
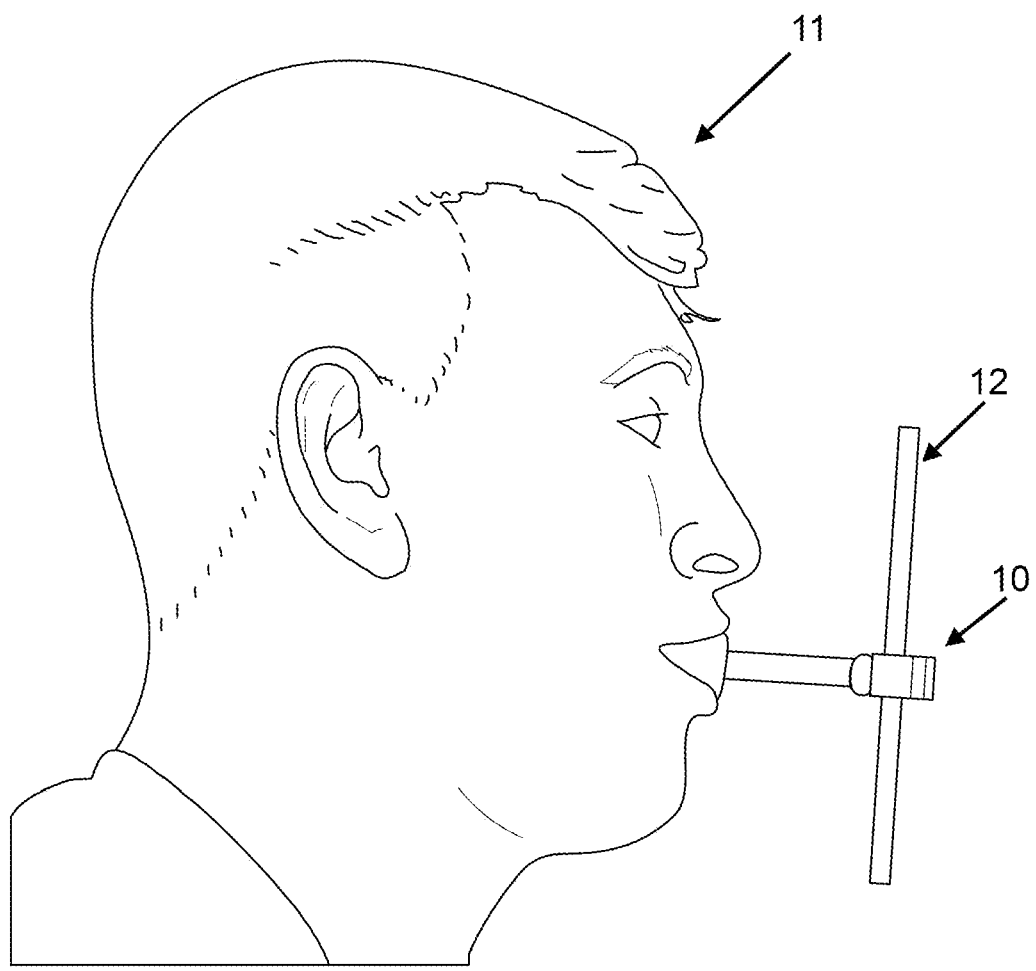
FIG. 1 shows an example embodiment of the present invention in use.

The present invention relates to a hands-free smartphone holder 10 for holding a smartphone 12 that is gripped by the mouth of a user 11 to enable hands free videos and photos. FIG. 1 shows the smartphone holder 10 in use.

FIGS. 2-9 show various embodiments and features of the smartphone holder 10.

The hands-free smartphone holder 10 may comprise a gripping element 14 adapted to be removably secured to a smartphone 12 and a mouthpiece 16 connected to the gripping element 14. The mouthpiece 16 is adapted to be held by a mouth of a user 11 such that a camera 18 of the smartphone 12 shows a point of view of the user 11.

As shown in FIGS. 2-8, the gripping element 14 may comprise a flexible band 20 with opposing ends 22 which are bendable into hooks for gripping opposing sides of the smartphone 12. The flexible band 20 may be adapted to grip the opposing sides of the smartphone 12 in a vertical or horizontal orientation.

When the gripping element 14 is secured to the smartphone 12, the flexible band 20 may be positioned across an area of a screen 13 of the smartphone 12 with the opposing ends 22 wrapping around to a back 15 of the smartphone, such that a camera 18 of the smartphone is facing away from the user 11 when in use.

Figure 8:
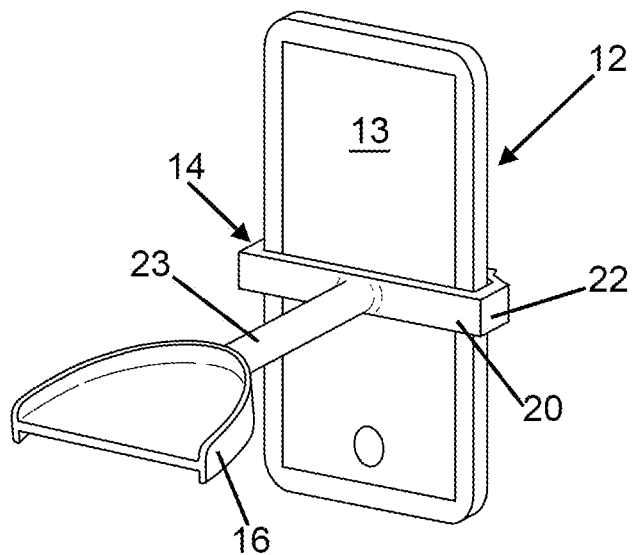
FIG. 8 shows a further example embodiment of the present invention with one-piece construction.

The mouthpiece 16 may be formed in one piece with the gripping element 14, as shown in FIG. 8. Alternatively, the mouthpiece 16 may be removably connected to the gripping element 14. For example, a connector 23 may be provided connecting the mouthpiece 16 to the gripping element 14.

Figure 2:
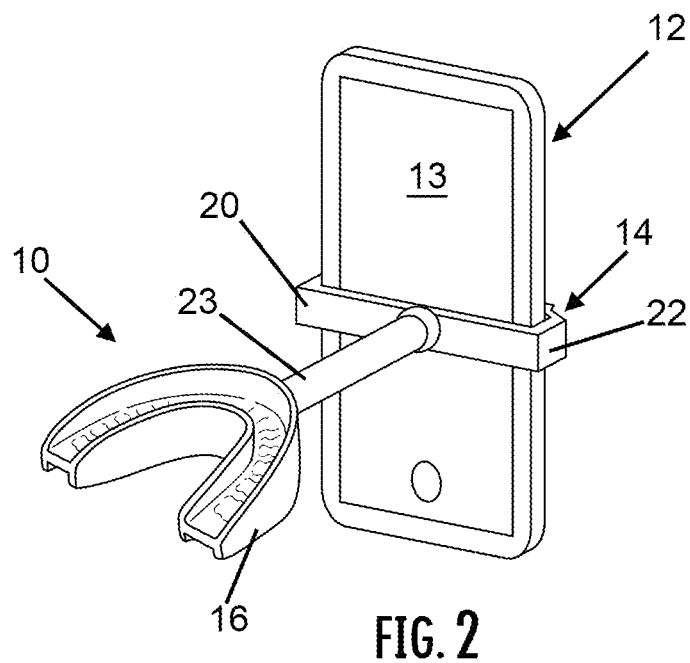
FIGS. 2 and 3 show an example embodiment of the present invention with a molded or moldable mouthpiece.
Figure 3:
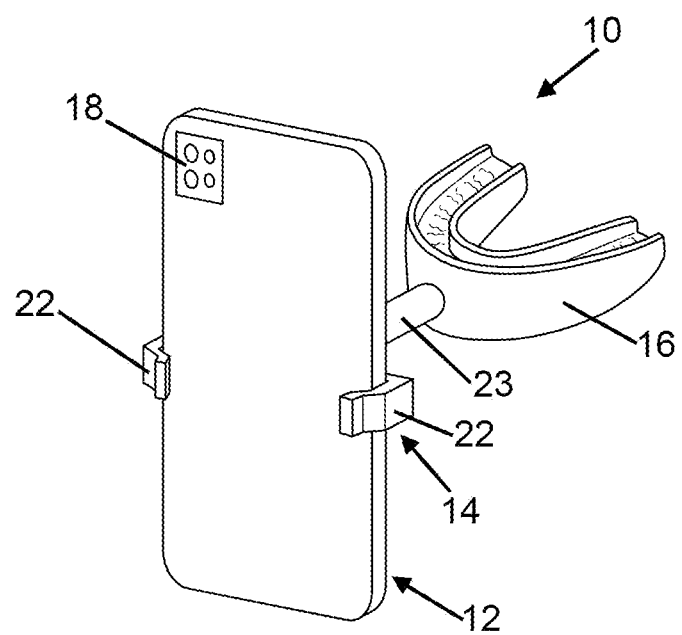
Figure 4:
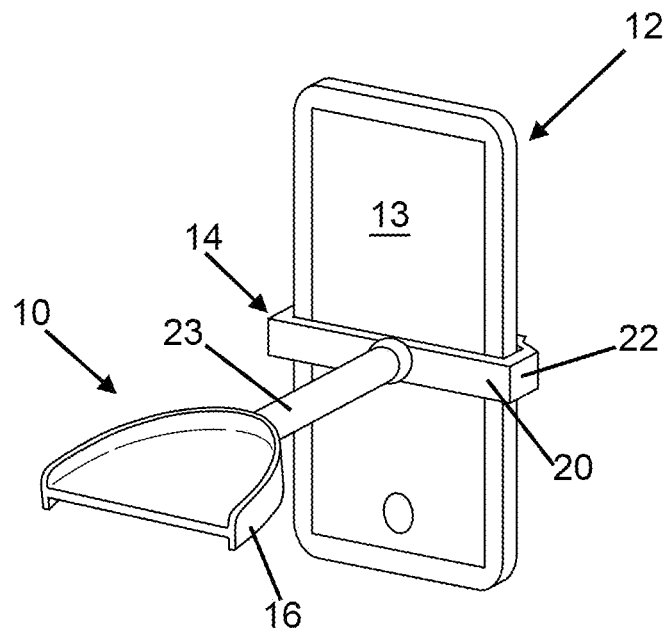
FIG. 4 shows a further example embodiment of the present invention with a plate-like mouthpiece.

The mouthpiece may take various forms. For example, the mouthpiece may comprise a boil and bite moldable mouthpiece as shown in FIGS. 2 and 3, a curved plate adapted to be held between upper and lower teeth of a user as shown in FIGS. 8 and 9, a preformed mouthpiece, or the like.

Figure 9:
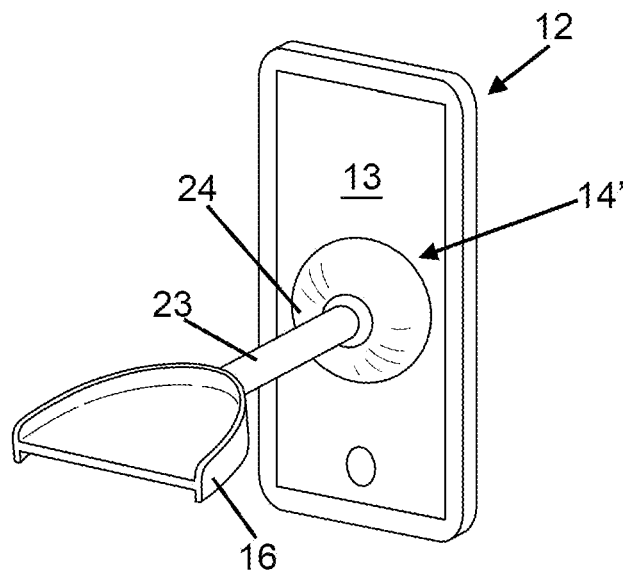
FIG. 9 shows a further example embodiment of the present invention.

In a further example embodiment as shown in FIG. 9, the gripping element 14' may comprise a removable adhesive or suction mount 24. The mouthpiece 16 may be connected to the mount 24 by connector 23.

Figure 7:
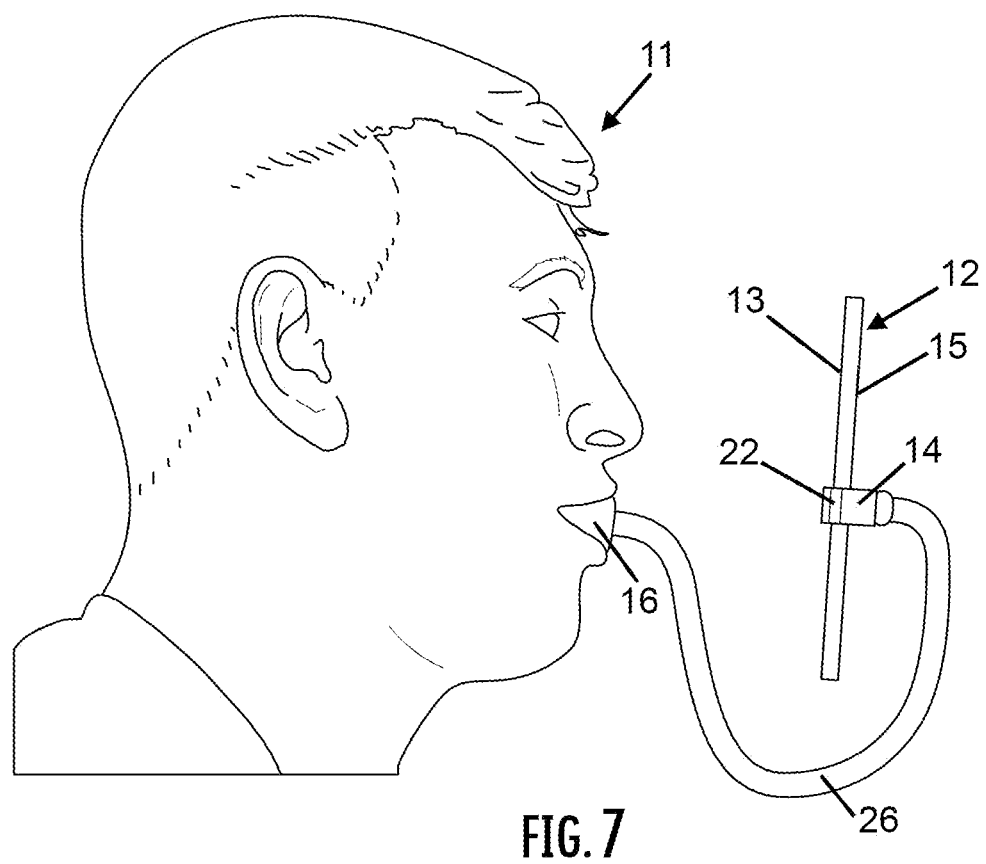
FIG. 7 shows a further example embodiment of the present invention.

In a further example embodiment as shown in FIG. 7, when the gripping element 14 is secured to the smartphone 12, the flexible band is positioned across an area of a back 15 of the smartphone 12 with the opposing ends 22 wrapping around to an area of a screen 13 of the smartphone 12. In such an embodiment, the mouthpiece 16 is connected to the smartphone 12 via an elongated flexible connector 26 that loops around from the back 15 of the smartphone 12 to a front 13 of the smartphone 12 such that a camera 18 of the smartphone 12 is facing away from the user 11 when in use.

Figure 5:
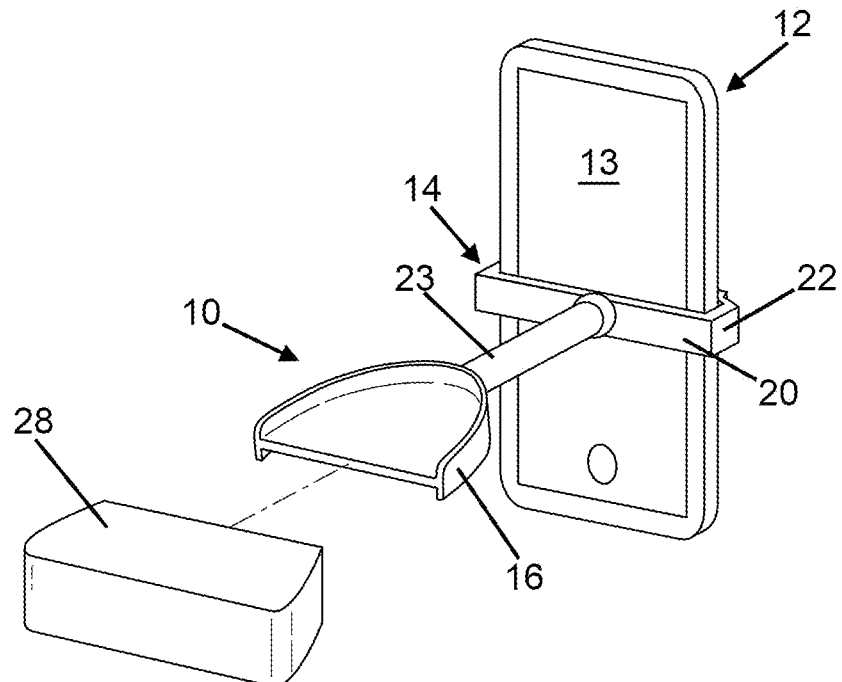
FIGS. 5 and 6 show example embodiments of removable covers for covering the mouthpiece in example embodiments of the present invention.
Figure 6:
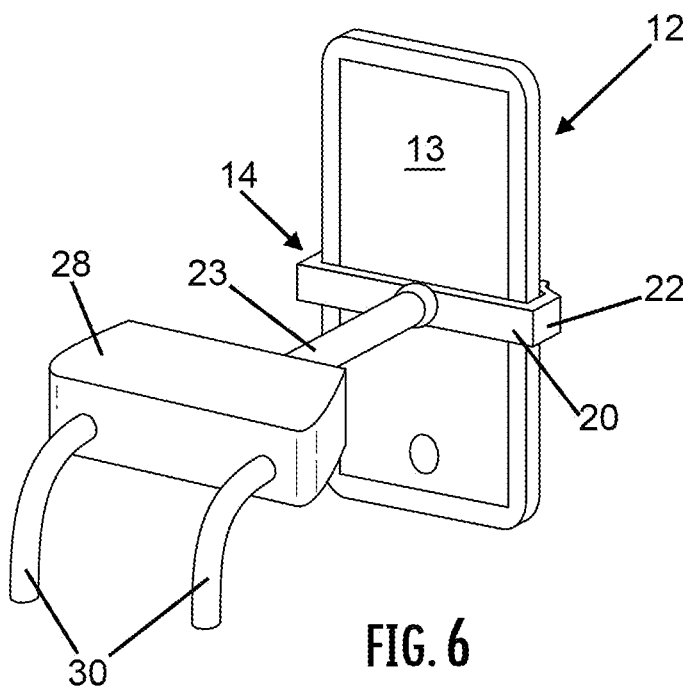

As shown in FIG. 5, a removable cover 28 may be provided for covering the mouthpiece 16. An exterior of the removable cover 28 may comprise a stand for the smartphone. As shown in FIG. 6, flexible or rigid legs 30 may be provided on the cover 28 in one example embodiment that enables the cover 28 to function as stand. However, the legs 28 are not required for the cover to function as a stand.

The gripping element 14 and/or the connector may comprise either a flexible/bendable/shapeable/deformable/resilient material or a rigid material. For example, the gripping element 14 and connector 23 may comprise a bendable lead or aluminum rod and/or strip encased in rubber or vinyl or a semi-flexible plastic material. Alternatively, the entire smartphone holder may be made of a rigid or semi-rigid plastic material via injection molding or 3D printing.

Such a hands-free smartphone holder provided in accordance with the present invention enables a user to take videos or pictures from the user's point of view (POV). In particular, the present invention enables the user to use their hands for an activity while taking POV videos or pictures, for example taking videos or pictures in a mirror during a user's activity, such as weightlifting, or taking POV videos or pictures of other activities.

It should now be appreciated that the present invention provides advantageous methods and apparatus for a hands-free smartphone holder.

Although the invention has been described in connection with various illustrated embodiments, numerous modifications and adaptations may be made thereto without departing from the spirit and scope of the invention as set forth in the claims.

What is claimed is:

1. A hands-free smartphone holder, comprising:
   a gripping element adapted to be removably secured to a smartphone;
   a mouthpiece connected to the gripping element;
   wherein:
   the mouthpiece, when held by a mouth of a user, is configured such that a camera of the smartphone shows a point of view of the user; and
   the entire hands-free smartphone holder is made of one single piece.

2. The hands-free smartphone holder of claim 1, wherein:
   the gripping element further comprises one of a removable adhesive mount or a suction mount.

3. The hands-free smartphone holder of claim 1, wherein the mouthpiece comprises one of:
   a curved plate which in use is held between upper and lower teeth of a user;
   a boil and bite moldable mouthpiece;
   a preformed mouthpiece.

4. A hands-free smartphone holder, comprising:
   a gripping element removably secured to a smartphone;
   a mouthpiece connected to the gripping element;
   wherein:
   the mouthpiece, when held by a mouth of a user, is configured such that a camera of the smartphone shows a point of view of the user; and
   the gripping element comprises two deformable, shapeable, flexible opposing ends which are bendable into hooks for gripping opposing sides of the smartphone.

5. The hands-free smartphone holder of claim 4, wherein the mouthpiece is removably connected to the gripping element.

6. The hands-free smartphone holder of claim 4, wherein the flexible opposing ends grip the opposing sides of the smartphone in a vertical or horizontal orientation.

7. The hands-free smartphone holder of claim 4, wherein, when the gripping element is secured to the smartphone, the flexible opposing ends are positioned across an area of a screen of the smartphone with the opposing ends wrapping around to a back of the smartphone such that a camera of the smartphone is facing away from the user when in use.

8. The hands-free smartphone holder of claim 4, wherein, when the gripping element is secured to the smartphone, the flexible opposing ends are positioned across an area of a back of the smartphone with the opposing ends wrapping around to an area of a screen of the smartphone.

9. A system for holding a hands-free smartphone, the system comprising:
   a hands-free smartphone holder; and
   a removable cover for covering the mouthpiece;
   wherein:
   the hands-free smartphone holder comprises:
      a gripping element adapted to be removably secured to a smartphone;
      a mouthpiece connected to the gripping element; and
   wherein:
   the mouthpiece, when held by a mouth of a user, is configured such that a camera of the smartphone shows a point of view of the user; and
   the entire hands-free smartphone holder is made of one single piece.

10. The system of claim 9, wherein an exterior of the removable cover comprises a stand for the smartphone.

11. The system of claim 9, wherein the hands-free smartphone holder further comprises: a connector portion between the mouthpiece and the gripping element.

* * * * *